April 9, 1929.  F. J. COX  1,707,976
HEATING APPLIANCE
Filed Oct. 31, 1922
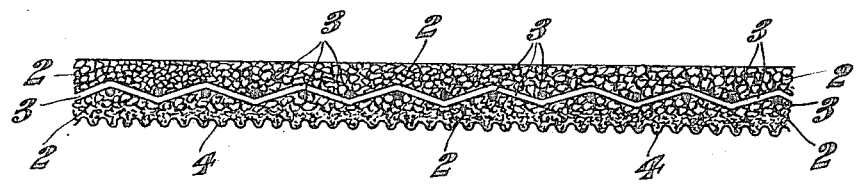
Inventor
Frederick John Cox
By J. B. Singer, atty.

Patented Apr. 9, 1929.

1,707,976

UNITED STATES PATENT OFFICE.

FREDERICK JOHN COX, OF LONDON, ENGLAND.

HEATING APPLIANCE.

Application filed October 31, 1922, Serial No. 598,223, and in Great Britain November 9, 1921.

This invention relates to a heating appliance of that nature where combustible gas in admixture with the desired proportion of oxygen is passed in regulated flow through a porous plate or diaphragm composed of granules of refractory material bound together into a porous mass, so that the combustion takes place substantially at and just beneath the surface of the plate or diaphragm which is thereby maintained in a state of incandescence.

The present invention consists primarily of a particular construction of plate or diaphragm made in accordance with a particular method and the invention further comprises improvements in the structure of the heating appliance as a whole of which the specially constructed plate or diaphragm forms the front.

The invention comprises a plate diaphragm of porous material for use in a surface combustion heating appliance using a combustible gas, wherein the plate or diaphragm is made from a suitable graded granular refractory material mixed with powder or siftings of refractory material and converted into plastic mass by the addition of diluted silicate of sodium, the plastic mass being moulded to the desired shape and then heated preferably while still in the mould until it becomes a rigid porous mass.

In accordance with the invention the porous plate or diaphragm is formed by taking granules of refractory material such as fire clay graded by sifting to the desired mesh—which varies with the particular use to which the appliance is to be put—and these granules are mixed with powder or siftings from the sifted refractory material. The mixture is then converted into a plastic mass by the addition of diluted silicate of sodium, the plastic mass being then introduced into a metal mould lined with wire gauze of suitable mesh. This wire gauze has the effect of preventing adhesion of the material to the walls of the mould. The moulded plate or diaphragm, preferably while still in the mould, is subjected to what is known as "stoving" at a temperature of about 300° F. for a period of roughly three hours. That is to say, it is maintained at or about the desired temperature until it becomes a rigid porous mass which will not readily disintegrate. The plate or diaphragm so formed is then made the front of an appliance which has a gas chamber at the back to which gas is admitted through a controlled pipe passage.

The gas chamber of my improved appliance differs from that of my appliances in general of the same form previously proposed in that the gas chamber is made considerably larger and the arrangement I prefer is to make the back of the chamber of concave internal form. The gas may be passed to this chamber in the desired mixture and passes through the plate or diaphragm from back to front the combustion taking place as aforesaid at the front surface which is maintained incandescent without flame.

In a modification of my appliance I may use ordinary gas burners which direct the gas upwardly to the front surface of the plate or diaphragm and in order to provide a sufficient supply of air I propose to provide the burners with additional air induction inlets in series with those ordinarily employed.

It will be understood that the thickness of the plates or diaphragms may vary considerably and where very thin plates are desired they may be reinforced by means of a metal or other supporting structure.

In order to increase the actual surface of incandescence I may mould the front of the plate or diaphragm of corrugated or irregular form.

The accompanying drawing is a section through one form of a diaphragm made in accordance with the invention. In this drawing 2 is the graded refractory material made as described above and reinforced by wire fabric 3 and made with a ribbed or corrugated outer surface 4. The upper layers of the graded refractory material 2 are of coarser grain than the lower ones.

What I claim and desire to secure by Letters Patent is:—

1. A moulded porous diaphragm for surface combustion apparatus, consisting of a mixture of refractory material in granular form and refractory material in powdered form and a binding material.

2. A moulded porous diaphragm for surface combustion apparatus, consisting of a mixture of the refractory material in the form of siftings and granules and a binding material.

3. A porous diaphragm for surface combustion apparatus, consisting of a mixture of the refractory material in granular and powedered form and diluted silicate of sodium.

4. A porous diaphragm for surface combustion apparatus, consisting of a mixture of refractory material in the form of siftings and granules, and dilute silicate of sodium, adapted to be moulded and stoved.

5. A composition for the porous diaphragms of surface combustion apparatus, consisting of a refractory material in granular form, a refractory material in powdered form, and a binding material, the material in granular form being of the same composition as that in powdered form.

6. A plastic composition for moulding the porous diaphragms of surface combustion apparatus, comprising a sifted refractory material in granular form, a refractory material in the form of siftings, and a binder material, the siftings being those from the sifted refractory material.

7. A plastic composition, for the porous diaphragms of surface combustion apparatus, consisting of a refractory material in granular form, a refractory material in powdered form, and dilute silicate of sodium, the material in granular form being of the same composition as that in powdered form.

8. A plastic composition for the porous diaphragms of surface combustion apparatus, consisting of a sifted refractory material in granular form, a refractory material in the form of siftings and dilute silicate of sodium, the siftings being those from the sifted refractory material.

In witness whereof I affix my signature.

FREDERICK JOHN COX.